United States Patent
Sym

[11] Patent Number: 6,029,977
[45] Date of Patent: Feb. 29, 2000

[54] INFLATABLE SEALS

[75] Inventor: William Richard Sym, Maidstone, United Kingdom

[73] Assignee: Magna International Investments (Barbados) Inc., Barbados

[21] Appl. No.: 08/810,759

[22] Filed: Mar. 4, 1997

[51] Int. Cl.[7] .................................................. F16J 15/46
[52] U.S. Cl. ......................... 277/312; 277/630; 277/641; 277/646
[58] Field of Search .................... 277/630, 646, 277/637, 641, 645, 312

[56] References Cited

U.S. PATENT DOCUMENTS

| | | | |
|---|---|---|---|
| 2,702,011 | 10/1955 | Krupp | 277/646 X |
| 3,074,129 | 1/1963 | Peterson | 164/228 |
| 3,102,309 | 9/1963 | Peterson | 164/228 |
| 3,161,229 | 12/1964 | Sanders | 277/646 X |
| 3,178,779 | 4/1965 | Clark et al. | 277/646 |
| 3,491,825 | 1/1970 | Peterson et al. | 277/646 X |
| 3,501,868 | 3/1970 | Ganzinotti | 277/646 X |
| 3,578,342 | 5/1971 | Satterthwaite et al. | 277/646 X |
| 4,227,702 | 10/1980 | Thate | 277/646 |
| 4,342,336 | 8/1982 | Satterthwaite et al. | |
| 4,396,451 | 8/1983 | Yeager | 156/285 |
| 4,399,314 | 8/1983 | Van Dyk, Jr. | |
| 4,886,442 | 12/1989 | McCowin et al. | 425/388 |
| 5,074,773 | 12/1991 | Tischler | 277/646 X |
| 5,209,498 | 5/1993 | Colin | 277/646 |

FOREIGN PATENT DOCUMENTS 2 175 966   12/1986   United Kingdom .

OTHER PUBLICATIONS

Commercial Brochure, "Seal Master Inflatable Seals", Jan. 1992, pp. 1–5.
Commercial Brochure, "Pneuma–Seal" 1987, pp. 4, 6, and "Type 8".

Primary Examiner—Anthony Knight
Assistant Examiner—Alison K. Pickard
Attorney, Agent, or Firm—Bacon & Thomas, PLLC

[57] ABSTRACT

An inflatable seal system in a tool having opposed parts which are relatively moveable together with the inflatable seal system therebetween. The inflatable seal system comprising a longitudinally extending seal cavity and a seal extending longitudinally along the seal cavity. The seal comprises an inflatable portion and an abutment portion for sealingly abutting against an opposing surface, wherein the inflatable portion remains in the seal cavity when the seal is deflated.

22 Claims, 4 Drawing Sheets

6,029,977

INFLATABLE SEALS

This invention relates to inflatable seals and in particular, but not exclusively, to inflatable seals in the field of the manufacture of interior panels for motor vehicles.

Certain types of interior panels for motor vehicles consist of a substrate (of e.g. glass reinforced urethane, fibre board or the like), a layer of foam, and then a skin (of e.g. PVC). In order to fabricate such panels the skin is placed in a cavity formed in the lower part of a tool. In one method, known as an 'open pour mould', liquid foam is then poured onto the skin and the substrate, which is supported by the upper part of the tool, is brought down to within a predetermined distance of the skin. An exothermic chemical reaction causes the foam to expand, filling the volume between the substrate and the skin. Alternatively, the foam could be injected between the skin and the substrate after the tool has been closed.

A seal is required between the upper and lower parts of the tool to prevent escape of the foam from around the periphery of the tool. After the foam has expanded, one technique involves lifting the upper tool initially by a small amount to release pressure slowly without fully opening the tool. However, the foam can then undergo further expansion, distorting the shape of the finished panel. It is therefore generally preferred to use an inflatable seal since this can be deflated slightly to allow the built-up pressure to be released without having to open the tool.

Thus in a known tool for producing vehicle interior panels, an inflatable seal is disposed around the periphery of one of the tool parts, usually the lower part. In multiple production runs it is necessary to clean excess dried foam that has been deposited by a previous operation from the edge of the tool part, in the region near the seal. This is done with sharp implements such as knives and scrapers. Whilst doing this the person scraping the tool may inadvertently cut or nick the seal, thereby causing it to leak when inflated. Not only does this cause considerable delay whilst the seal is replaced, but the leak may not be noticed until after the foam has been poured and the tool parts brought together, potentially causing defects in the panel which then has to be discarded.

In an attempt to solve this problem, it is possible to use a seal reinforced by fibres running along the length of the seal. Whilst this does go some way to alleviating the problem, it has the drawback of reducing the flexibility of the seal, thereby restricting its usefulness for applications in vehicle interior panel production where it is often necessary to incorporate relatively tight curves in the path of the seal.

According to one aspect of the present invention, there is provided an inflatable seal system in a tool having opposed parts which are relatively movable together with the inflatable seal system therebetween, the inflatable seal system comprising a longitudinally extending seal cavity and a seal extending longitudinally along the seal cavity, said seal comprising an inflatable portion and an abutment portion for sealingly abutting against an opposing surface, wherein the inflatable portion remains in the seal cavity when the seal is deflated.

With such an arrangement, when the seal is deflated, the inflatable portion of the seal is protected from damage, for example from scraping implements, by virtue of it remaining in the seal cavity.

The abutment portion may be formed so as to be relatively thick in the radial direction when compared to the inflatable portion and also solid so that, even if the abutment portion projects from the seal cavity when the seal is deflated, any damage caused by scraping or cleaning implements will not cause the inflatable seal to leak. The arrangement is preferably such that only the abutment portion is exposed to the outside when the seal is deflated.

Because the inflatable portion of the seal is protected by the seal cavity, the seal can be made to be relatively deformable, so that it can readily follow arcuate portions of the seal cavity, even quite sharply curved portions if required. It is thus not necessary to mould the seal specially to fit the arcuate portions of a particular cavity. Such arcuate portions may be arcuate in the lateral direction, the upward direction (so as to be "convex") or the downward direction (so as to be "concave"). It will be appreciated that references to "upward" or "downward" herein are used for the purposes of explanation and on the basis that the seal cavity has a "bottom" and a "top", but should not be understood as limiting the orientation in which the inflatable seal system may be used. Thus the top of the seal cavity may face upwardly, downwardly, sideways etc.

The seal is preferably not reinforced by a second material. Thus the seal may be relatively deformable and easy and inexpensive to manufacture, as compared to e.g. fibre-reinforced rubber.

Preferably the inflatable seal is an extrusion. Again, this allows it to be easy and inexpensive to manufacture.

The seal cavity may be formed of parts which can be opened up to allow location of the seal, but preferably the seal cavity is of fixed shape. For example, the seal cavity may be defined in a body of moulded material e.g. moulded resin.

Although the seal may be axially insertable along the seal cavity, the arrangement is preferably such that the seal is inflatable into the seal cavity through the top thereof. This will greatly facilitate location of the seal and is advantageous in situations where the seal has to be periodically replaced. In order to allow for such insertion, the abutment portion preferably has a width narrower than that of the seal cavity.

It is preferred for the inflatable portion of the seal to remain in the seal cavity when the seal is inflated. This provides further protection for the inflatable portion. In a preferred arrangement, the seal cavity has a main portion in which the inflatable portion of the seal is located, and has at its top a longitudinally extending slot which has a width less than that of the main portion and through which the abutment portion projects when the seal is inflated.

Inevitably small air leaks will sometimes occur from the inflatable seal causing it to lose effectiveness. If these are not too serious, it is possible to increase the pressure at which the seal is inflated in order to compensate. If the inflatable portion of the seal is constrained by the seal cavity when the seal is inflated, the seal can withstand higher pressures as its tolerance to high pressure is not limited to the surface strength of the material from which the inflatable seal is fabricated.

The inflatable portion and the abutment portion of the seal may be formed separately of each other. Preferably, however, they are formed integrally with each other. This again allows the seal to be easy and inexpensive to manufacture, e.g. as an extrusion. In addition, when it is necessary to replace the seal, only one member has to be located along the seal cavity. Thus an integral seal is easier to use than a two part seal.

In a preferred embodiment the seal further comprises an inwardly projecting member such as a tongue or the like projecting into the seal to prevent the abutment portion of the seal fully entering the seal cavity when the seal is deflated. Such a projecting member is of particular value when the seal cavity has a concave arcuate portion, i.e. when the path of the cavity is such that the seal must be curved with its abutment portion on the inside of the curve. In many situations a degree of concavity can be accommodated without any problems, but in some circumstances there may be a tendency for the abutment portion to get stuck in the seal cavity, when the seal is deflated, so that it fails to emerge to effect sealing upon inflatable of the seal. Thus the inwardly projecting member may be provided in order to alleviate this problem. It can also ensure that the abutment portion remains at the top of the seal cavity when the seal is deflated, so that the inflatable portion is not exposed to the outside and is thus further protected.

One or more inwardly projecting members may be provided, for example projecting laterally inwardly. Preferably, a member projects radially inwardly from a wall of the inflatable portion which is substantially opposite the abutment portion.

Whilst the seal could be inflated by a suitable liquid, preferably a gas is used to inflate the seal and most preferably compressed air is used.

The seal may be custom made, e.g. moulded, for a particular seal cavity, taking account of its specific curvature (s) along its length. However, this is relatively expensive, particularly when the seal has to be periodically replaced. It is therefore advantageous to provide a long length of seal, e.g. stored on a reel, and then to cut an appropriate length of seal for the seal cavity. Preferably, therefore, the seal extending along the seal cavity has cut ends, and the inflatable seal system preferably further comprises a connector for communicating the seal with a source of pressurised fluid at one end of the seal, the other end of the seal being closed to prevent escape of fluid therefrom.

With such a system, new lengths of seal can simply be cut from a store thereof and installed as required. This is not the practice with known inflatable seal systems which normally have an integrally moulded fitting for pressurised fluid supply, either in a radial wall or an axial end wall, and one or more integrally moulded end portions to prevent fluid escape. Such known seals are thus effectively restricted to being used with a specific seal cavity.

In fact, such an arrangement is inventive in its own right and is of independent patentable significance. It may be used in inflatable seal systems generally, and not only in inflatable seal systems for use between opposed tool parts.

Viewed from another aspect therefore, the invention provides an inflatable seal system comprising a longitudinally extending seal cavity and a seal extending longitudinally along the seal cavity, the seal being cut to a length appropriate for the seal cavity, a connector for communicating the seal with a source of pressurised fluid being provided at one end of the seal, and the other end of the seal being closed to prevent escape of fluid therefrom.

The invention also provides a method of installing an inflatable seal comprising locating a longitudinally extending seal along a longitudinally extending seal cavity, cutting the seal to an appropriate length, providing, at one end of the seal, a connector for communicating the seal with a source of pressurised fluid, and closing the other end of the seal to prevent escape of fluid therefrom.

A plurality of disposable connectors may be provided, so as to use a new connector each time a new length of seal is cut for use in the system. Preferably, however, the connector is removable so as to be available for reuse with another length of seal.

In a preferred embodiment, the connector is applied substantially axially of the seal, for example having a male portion which fits axially into the open end of the inflatable portion. A clamp is preferably provided around the outside of the seal to hold it against the male portion in sealing manner.

The other end of the seal, remote from the connector, may for example be closed by a simple clamp or the like which compresses the walls of the seal together. Preferably however the other end is closed by a male portion which fits into the inflatable portion, similarly to the connector.

The seal may be cut to length either before or after it has been located along the seal cavity. It may be located by axial insertion, but preferably it is inserted into said seal cavity through a slot in the top thereof.

It will be appreciated that the above arrangement, involving cutting lengths of seal from a supply thereof, is well suited to having the seal formed by extrusion. At the seal manufacture stage, no special fittings or mouldings have to be provided. There may be significant cost savings over 'made to order' seals since long runs may be produced by the seal manufacture whereas the end user, e.g. the tooling engineer, can simply take a length of seal 'off the shelf' for use in any size or shape of e.g. tool.

It will be seen by those skilled in the art that the invention also extends to a method of making a product using an inflatable seal system in a tool having opposed parts which are to be relatively movable together with the inflatable seal therebetween, wherein the product is disposed between the opposed tool parts and wherein the inflatable seal system is as set out herein.

As mentioned above, the seal cavity may be defined in a body of moulded material. Viewed from a further aspect the invention provides a method of making an inflatable seal system in a tool having opposed parts which are to be relatively movable together with the inflatable seal therebetween, the method comprising the steps of:

placing a core element along a path on one of the tool parts which is to be sealed;

moulding a material around the core element;

removing the core element so as to leave a seal cavity, and locating along the seal cavity an inflatable seal having an abutment portion and an inflatable portion, such that, when the seal is deflated said inflatable portion remains in the seal cavity.

Certain preferred embodiments of the invention will now be described, by way of example only, with reference to the accompanying drawings in which.

Figure 1:
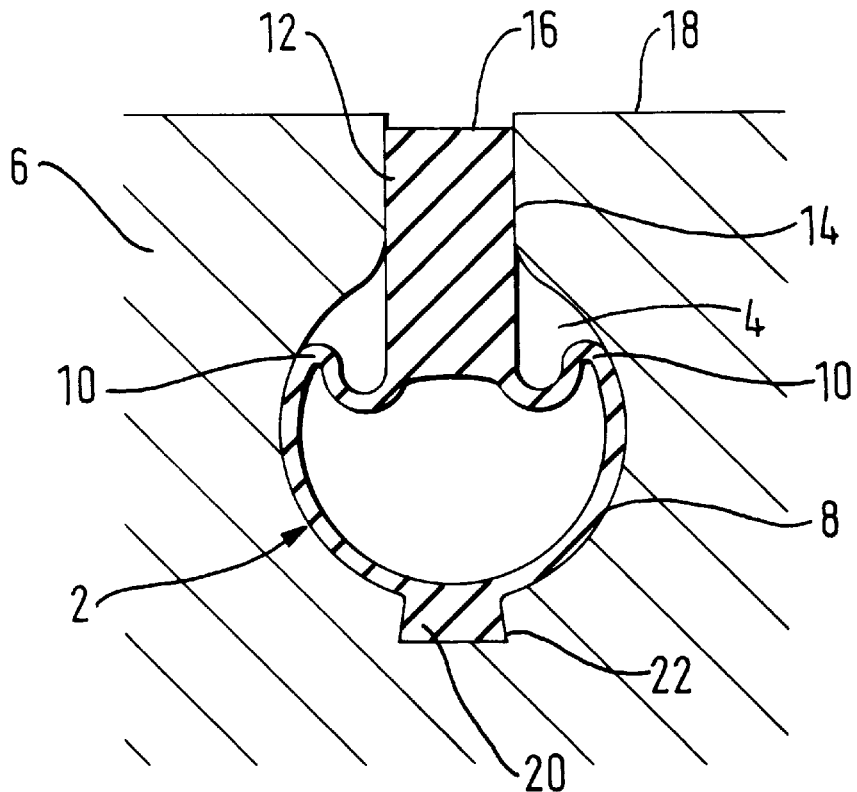
FIG. 1 is a cross-sectional view of an inflatable seal in a seal cavity.

Referring to FIG. 1, an inflatable seal 2 is fitted into a seal cavity 4 in a mould 6 which forms the lower part of a tool used to fabricate vehicle interior panels. The seal is preferably made of extruded rubber. The majority of the perimeter of the seal serves as an inflatable portion 8 and is formed of relatively thin rubber i.e. thin enough to flex and allow the seal to expand when it is inflated. In particular two shoulders 10 are formed to allow the top part of the seal to sag down when the seal is in its deflated state. Integrally formed on the top part of the seal is a generally rectangular solid abutment portion 12. The abutment portion is constrained to slide vertically within a vertical slot 14 communicating the cavity 4. As seen from FIG. 1, in this embodiment the top 16 of the abutment portion lies below the level of the tool surface 18 in the uninflated state, with the advantage that a scraping implement passed over the tool surface will not contact the top 16. However the top 16 could alternatively lie flush with or above the level of the tool surface 18, because the relatively thick dimensions of the abutment portion 12 enable it to withstand a certain amount of damage from a scraping element without its sealing function being significantly impaired. At the base of the seal is a locating lug 20 which may optionally be provided on the seal to fit into a corresponding recess 22 in the seal cavity 4.

When compressed air is passed into the seal, the inflatable portion 8 is pressed outwardly against the walls of the cavity. Where the top part of the seal sags down about the shoulders 10, pressure inside the seal forces the rest of inflatable portion 8 to move up into contact with the walls of the cavity 4, thereby forcing the abutment portion 12 to slide up in the slot 14 so that the top 16 of this portion stands either proud or further proud of the tool surface 18. The extent of vertical movement is designed so that the top 16 of the abutment portion 12 sealing abuts against an opposing surface (omitted for clarity) upon inflation of the seal 2. The seal produced between the seal surface 16 and the opposing surface prevents the escape of foam from the tool. To release the pressure in the tool, the seal may be broken simply by releasing the pressure inside the inflatable seal. This allows the abutment portion 12 to fall away from the opposing surface under its own weight, by virtue of the resilience of the seal towards its natural shape or by the pressure of gases which build up in the tool during the foam filling process. It is not however necessary to move the tool surface 18 and opposing surface away from each other, thus preventing irregularities occurring in the foam due to further expansion thereof.

Between foam filling operations, excess foam deposited on the tool surface 18 must be removed. This is done with a sharp implement such as a knife or the like. Scraping across the surface of the tool surface 18 cannot damage the inflatable portion 8, as this remains in the seal cavity 4. Moreover, even if the user of the knife inadvertently puts the blade into the seal cavity the inflatable portion is protected since the only exposed part is the solid abutment portion 12. The thin walled inflatable portion 8, which would have been punctured by such a slip, is inaccessible.

Figure 2:
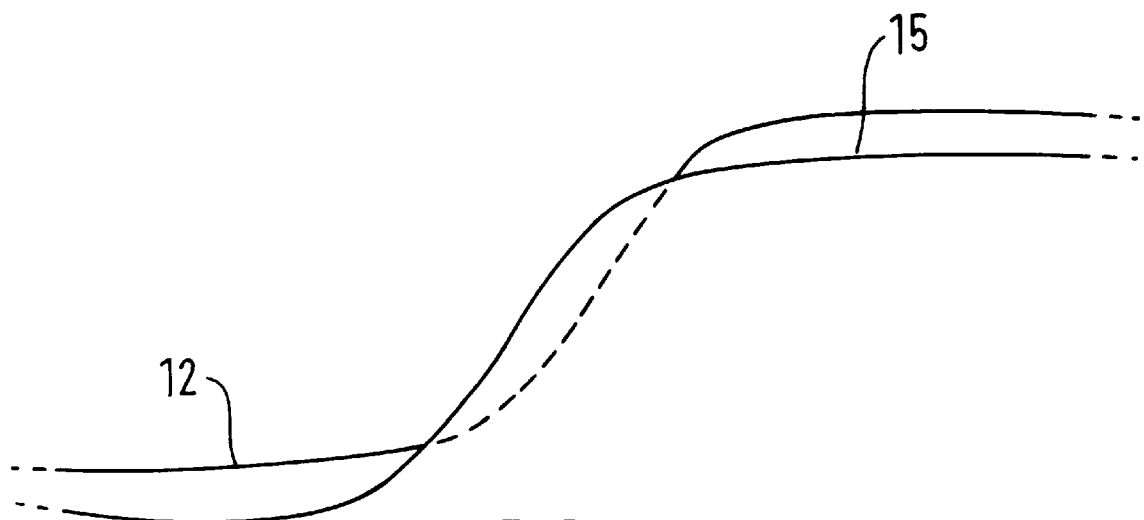
FIGS. 2 and 3 are respectively longitudinal and transverse cross-sectional views showing how a seal can become stuck in a seal cavity.
Figure 3:
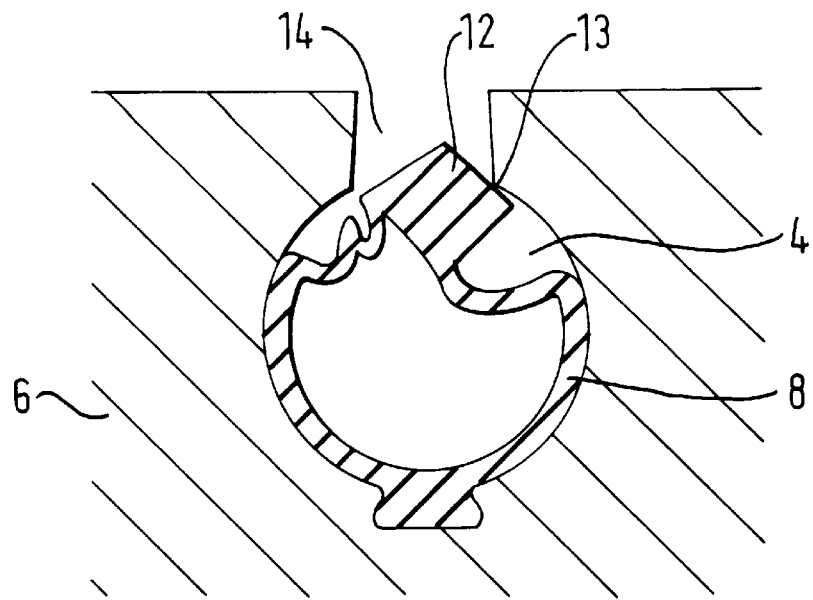
Figure 4:
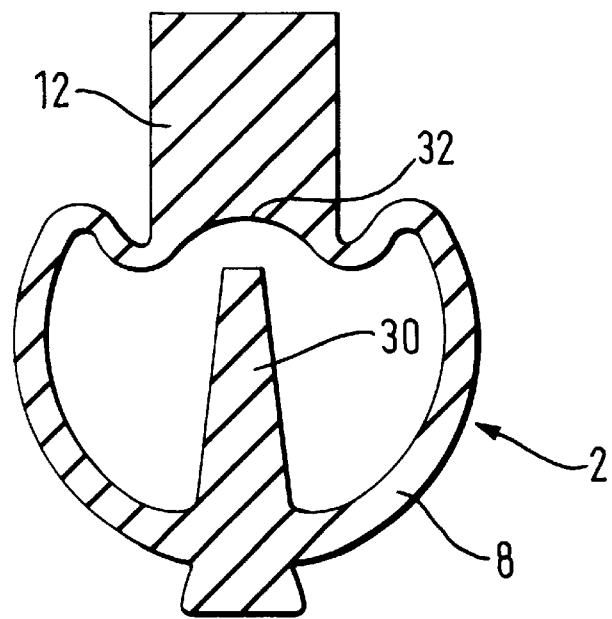
FIG. 4 is a cross-sectional view of another embodiment of the inflatable seal having a tongue.

When used in the fabrication of vehicle interior panels the seal cavity 4 will frequently need to follow a longitudinal path which may be curved in both the vertical and horizontal directions. As may be seen from FIG. 2 certain combinations of vertical curves can cause the abutment portion 12 of the seal to tend to move so far down from the top 15 of the slot 14 that it becomes stuck as shown in FIG. 3 at the point 13 where the slot 14 joins the main body of the cavity 4. In order to prevent this happening the inflatable seal may be provided with an inwardly projecting member in the form of a tongue 30 as may be seen from the embodiment in FIG. 4. When fitting the seal, the tongue 30 prevents the bottom edge 32 of the abutment portion 12 from being pulled too far inside the seal and thus the abutment portion 12 is maintained within the entrance passageway 14. The tongue 30 has no material effect on the operation of the seal when it is inflated.

Figure 5:
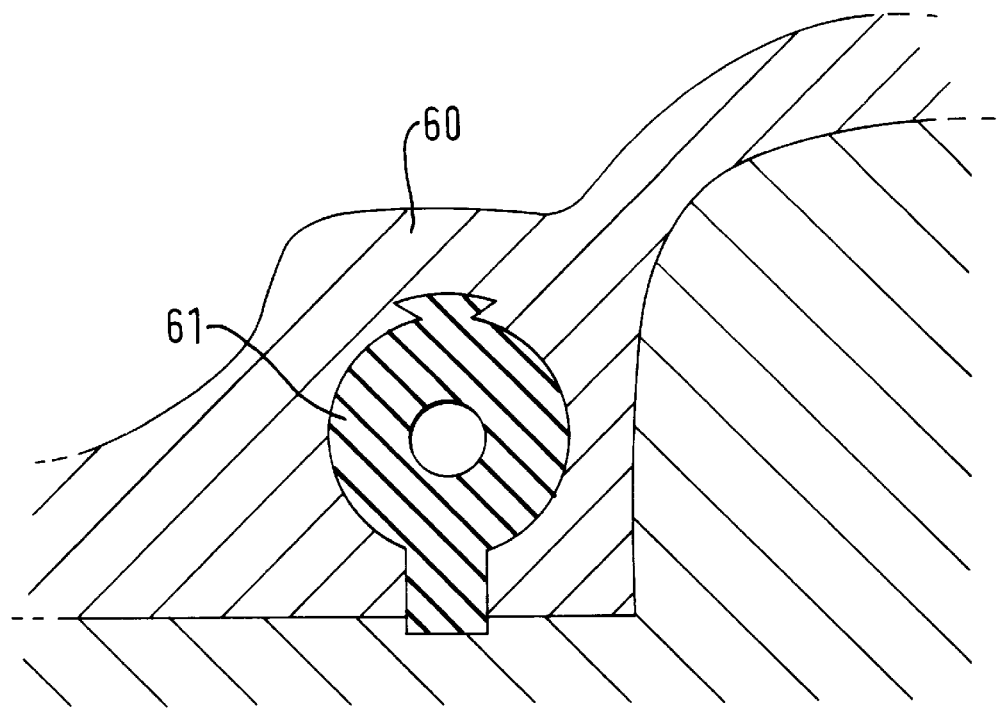
FIG. 5 is a partial cross-sectional view of the lower part of a tool being moulded with a seal cavity.

The production of the cavity 4 in the lower part of the tool will now be described with reference to FIG. 5. Firstly the basic shape of the tool is made. Then a core element 61 is laid around the path which is to be sealed. Clearly, if the seal is to have termination assemblies at each end then it cannot form a continuous loop and so a solid bridging seal 62 (see FIG. 6) is provided to join the two ends. Indeed, the path to be sealed by the inflatable seal need not follow substantially the whole contour of the tool, but may instead be in the form of one or more short sections which are joined by solid seals. Hence a length of core element is placed along every path element where it is desired to have an inflatable seal. Rein is then poured over the core element and allowed to harden. The core element is pulled out of the tool longitudinally from one end to leave a seal cavity 4. The exact length and path of the seal cavity is not critical since it does not need to match a particular prefabricated seal. Instead, the seal is cut to the right length after the cavity has been cast.

Figure 6:
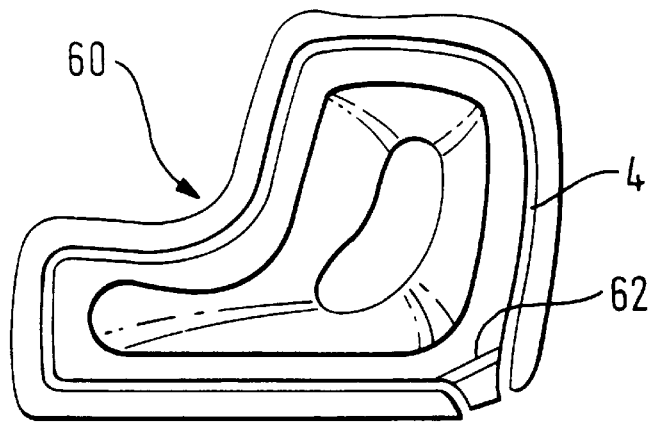
FIG. 6 is a plan view of the lower part of a tool when empty.

The lower tool part 60 will then have an appearance as shown in FIG. 6. The seal cavity 4 in this example extends substantially all the way round the lower tool part 60 except for a short length of solid bridging seal 62, in the region of the ends of the seal cavity, where the connections to a compressed air supply must be made to the seal once fitted.

To fit the seal, a long length of inflatable seal 2 is taken. The seal is then fitted into the seal cavity 4. For short or relatively straight paths to be sealed, the seal may be slid longitudinally along the cavity from one end, although for more complicated paths, as in this example, it is easier to inset the seal into the cavity from the top by pinching the inflatable portion 8 and pushing it through the slot 14 into the cavity 4. Once the seal has been fitted into the cavity it may be cut to the appropriate length at both ends.

Figure 7:
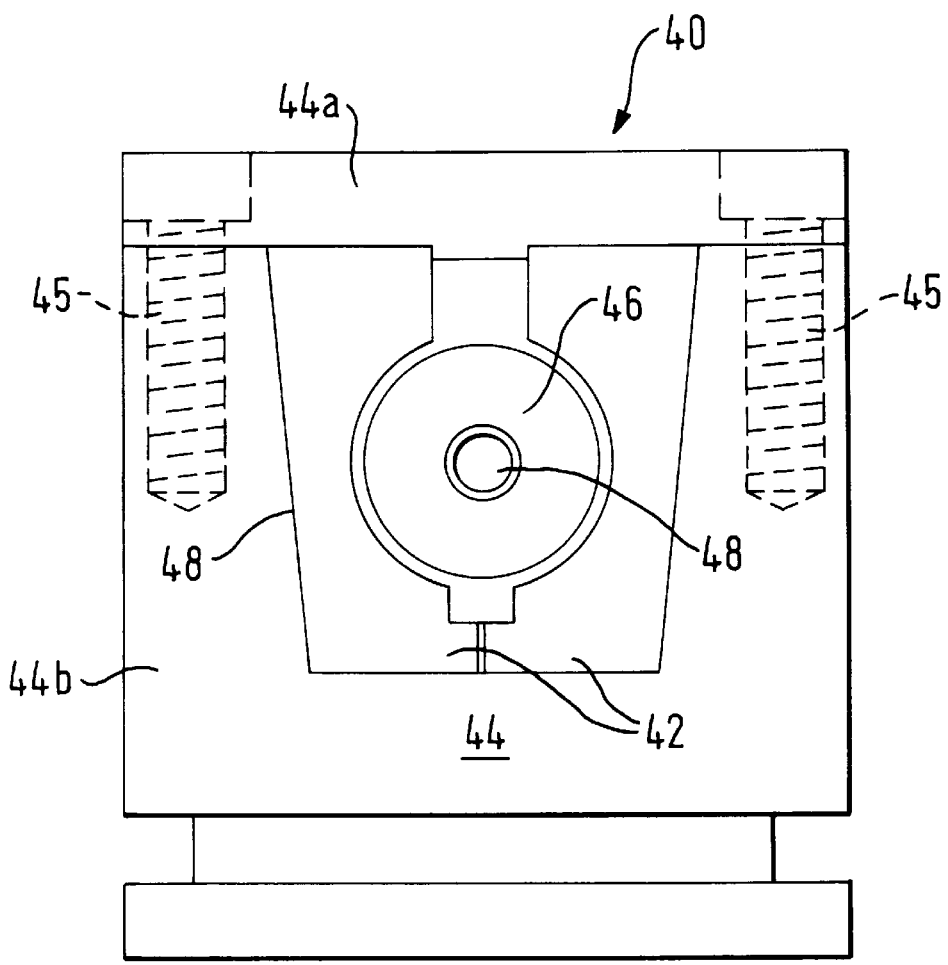
FIG. 7 is a front view of a termination assembly for the inflatable seal.

At both ends there is provided a termination assembly as shown in FIG. 7 and denoted generally by the numeral 40. The assembly 40 comprises a two-piece collet 42 which is placed around the seal and a housing body 44. The housing body is in two parts 44a and 44b which are bolted together by bolts 45. The lower part 44a is fixed to the lower tool part 60. A brass air connector 46 is inserted axially into the seal 2 so that the cut end of the seal abuts the underside of a collar (not shown) which is formed at the end of the connector. The air connector has a small air supply hole 48 which communicates with the interior of the seal, and is formed with an internal thread. At one end of the length of seal the threaded end of a compressed air supply pipe is attached to the threaded hole 48. At the other end a blanking screw (now shown) is screwed into the threaded hole 48 to block this end off. The seal 2 is clamped between the air connector 46 and collet 42 by forcing the arms of the collet together by pushing them into a tapered recess 48 in the housing body 44. This is achieved when housing part 44a is bolted onto housing part 44b.

The termination assembly may be modified to accommodate seals 2 of different cross-sectional shapes. For example, in the case of the seal shown in FIG. 4, the connector 46 would have an axially extending recess to receive the tongue 30, and the air supply hole 48 would be laterally offset to avoid the tongue 30.

Figure 8:
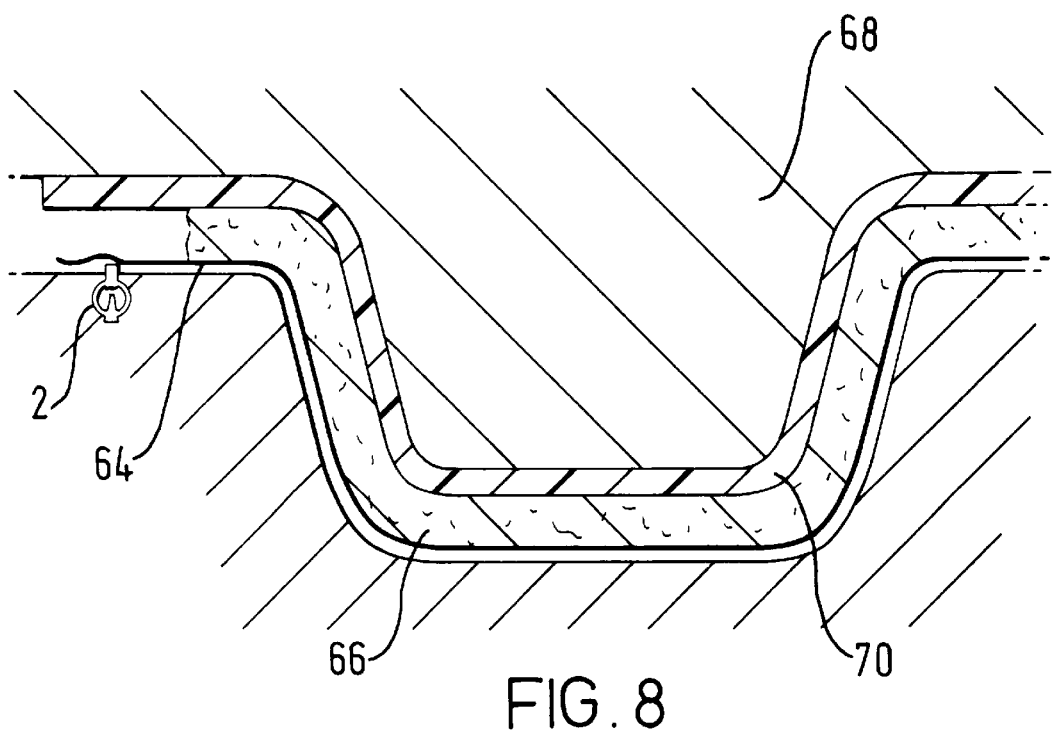
FIG. 8 is a partial cross-sectional view of a tool for making a vehicle interior panel before being compressed.

Next (see FIG. 8) a PVC or ABS skin 64 is laid over the lower part of the tool 60 and a substrate made from e.g. plastic injection moulding or wood fibre moulding is fitted to the upper part of the tool 68.

The skin is then covered with foam 66, to which a chemical accelerator has been added, and which then starts to undergo a chemical reaction and harden. The substrate carried by the upper tool part 68 is brought down to a pre-determined distance away from the lower tool part 60. As the foam 6 expands and hardens it will be expel gases such as the reaction products and also air, from between the tool parts 60. When the foam has expanded until it has almost reached the inflatable seal, the seal is inflated. Thus the foam is prevented from escaping, but at the same time the formation of gas pockets is prevented which could impair the quality of the finished panel. Once the foam 60 has been allowed to set by a pre-determined amount, the seal 2 is deflated again to de-gas the tool. Since the tool parts have not yet been moved apart again at this stage, the panel remains supported and clamped and therefore does not have a tendency to bulge. Once the foam has fully hardened and any residual gas has escaped, the tool parts 60,68 may safely be moved apart again. These steps may be automated e.g. by a suitable timed control.

Whilst a method of manufacturing vehicle interior panels using an 'open pour' technique has been described, an injection mould technique could alternatively be used whereby the tool is closed before foam is injected into it. Indeed, there may be circumstances in which this method is preferred since it may not release as may fumes into the working environment as the 'open pour' technique.

It will be understood by those skilled in the art that although the present invention has been described in terms of a specific embodiment in the context of vehicle interior panel manufacture, appropriate aspects may be applied with equal utility in any application where an inflatable seal is desirable.

I claim:

1. An inflatable seal system in a tool having opposed parts which are relatively moveable together with the inflatable seal system therebetween, the inflatable seal system comprising a longitudinally extending seal cavity, said seal cavity having a cavity mouth in the form of a slot, a seal extending longitudinally along the seal cavity, said seal comprising an inflatable portion and an abutment portion for sealingly abutting against an opposing surface, said seal including an inwardly projecting member which projects radially inwardly into the seal from a wall of the inflatable portion which is substantially opposite and not connected to said abutment portion by said inwardly projecting member to prevent the abutment portion of the seal fully entering the seal cavity when the seal is deflated wherein the abutment portion is slidable within said slot and the inflatable portion remains in the seal cavity when the seal is deflated.

2. An inflatable seal system as claimed in claim 1, wherein the seal and the seal cavity are such that during assembly of the inflatable seal system the seal can be inserted into the seal cavity through the top thereof.

3. An inflatable seal system as claimed in claim 1, wherein the inflatable portion and the abutment portion are formed integrally with each other.

4. An inflatable seal system as claimed in claim 1, wherein the seal is an extrusion.

5. An inflatable seal system as claimed in claim 1, wherein the seal is not reinforced by a second material.

6. An inflatable seal system as claimed in claim 1, wherein the seal cavity is defined in a body of moulded material.

7. An inflatable seal system as claimed in claim 1, wherein the seal has cut ends, a connector for communicating the seal with a source of pressurised fluid being provided at one end of the seal, and the other end of the seal being closed to prevent escape of fluid therefrom.

8. An inflatable seal system as claimed in claim 7, wherein the connector is removable so as to be available for reuse with another length of seal.

9. An inflatable seal system as claimed in claim 8, wherein the connector is applied substantially axially of the seal.

10. An inflatable seal system as claimed in claim 7, wherein the connector is applied substantially axially of the seal.

11. A method of installing an inflatable seal comprising locating a longitudinally extending seal along a longitudinally extending seal cavity, cutting the seal to an appropriate length, inserting into at one end of the seal, a connector for communicating the seal with a source of pressurised fluid, and closing the other end of the seal to prevent escape of fluid therefrom.

12. A method as claimed in claim 1, which comprises inserting said seal into said seal cavity through a slot in the top thereof.

13. The method as claimed in claim 11, wherein said seal comprises an inflatable portion and an abutment portion for sealingly abutting against an opposing surface and wherein the inflatable portion remains in the seal cavity when the seal is deflated.

14. The method as claimed in claim 13, wherein said seal further comprises an inwardly projecting member projecting into the seal to prevent the abutment portion of the seal fully entering the seal cavity when the seal is deflated.

15. The method as claimed in claim 14, wherein said member projects radially inwardly from a wall of the inflatable portion which is substantially opposite said abutment portion.

16. The method as claimed in claim 13, wherein the inflatable portion and the abutment portion are formed integrally with each other.

17. The method as claimed in claim 13, wherein the seal is an extrusion.

18. The method as claimed in claim 13, wherein the seal is not reinforced by a second material.

19. The method as claimed in claim 11, wherein the seal cavity is defined in a body of moulded material.

20. An inflatable seal system produced by the method of claim 11 and comprising a longitudinally extending seal cavity and a seal extending longitudinally along the seal cavity, the seal being cut to a length appropriate for the seal cavity, a connector for communicating the seal with a source of pressurized fluid being inserted in one end of the seal, and the other end of the seal being closed to prevent escape of fluid therefrom.

21. A method of making a moulded article comprising placing an article to be moulded between first and second mould parts, one of said first and second mould parts comprising an inflatable seal system as claimed in claim 1, moving said first and second mould parts together, inflating said seal system, performing a moulding operation, deflating said inflatable seal system, moving said first and second mould parts apart, and removing said moulded article.

22. A method of making a moulded article comprising placing an article to be moulded between first and second mould parts, one of said first and second mould parts comprising an inflatable seal system as claimed in claim 20, moving said first and second mould parts together, inflating said seal system, performing a moulding operation, deflating said inflatable seal system, moving said first and second mould parts apart, and removing said moulded article.

* * * * *